July 13, 1926.
1,592,671
C. R. NICHOLS
MEANS FOR POSITIONING REENFORCEMENTS WITHIN MOLDS FOR
MAKING BODIES OF PLASTIC MATERIAL
Filed Oct. 16, 1925
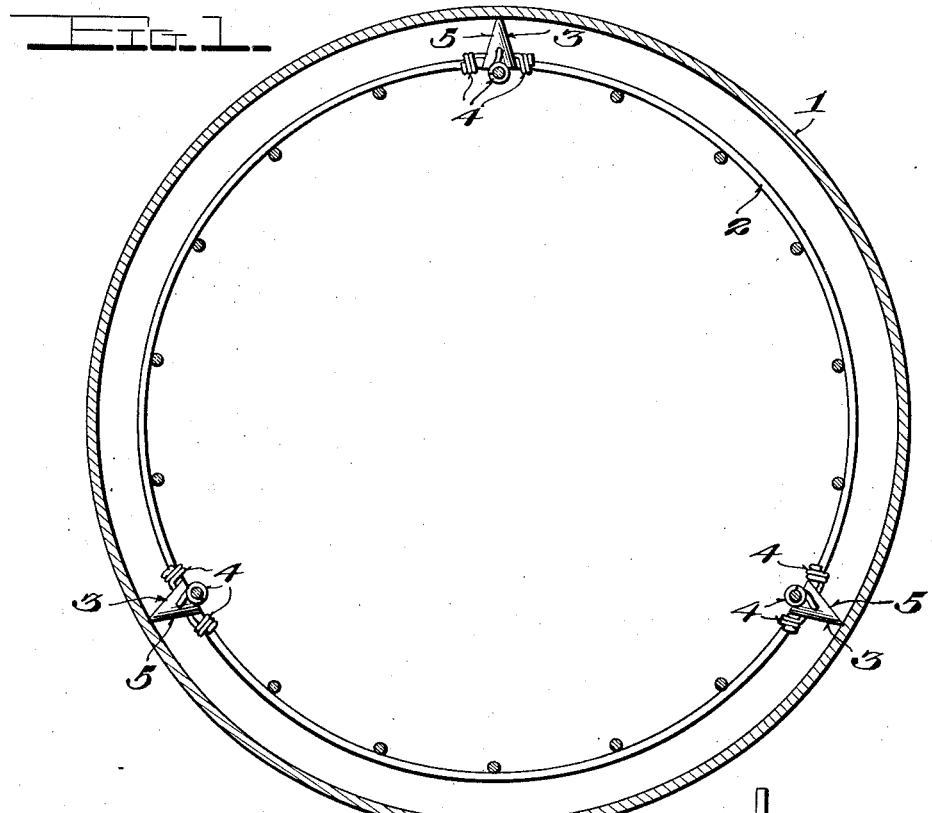
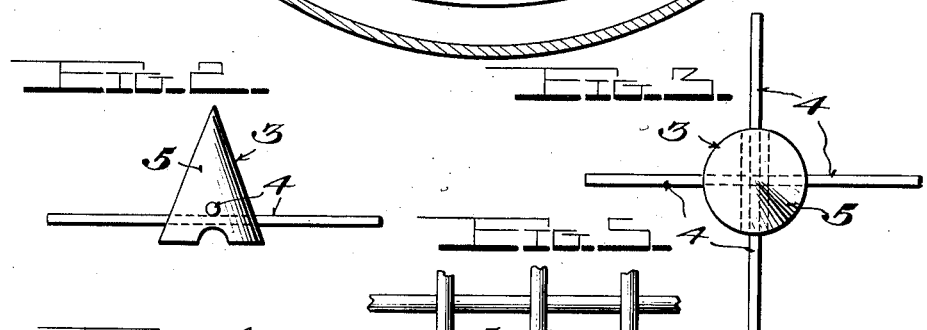
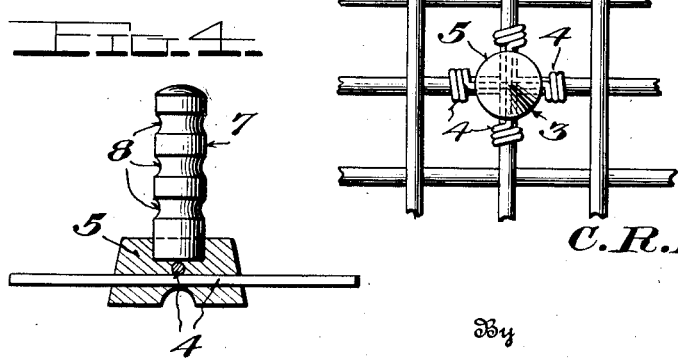
Inventor
C. R. Nichols,
By
G. C. Waldrop  Attorney Patented July 13, 1926.

1,592,671

UNITED STATES PATENT OFFICE.

CLIFFORD R. NICHOLS, OF DETROIT, MICHIGAN.

MEANS FOR POSITIONING REENFORCEMENTS WITHIN MOLDS FOR MAKING BODIES OF PLASTIC MATERIAL.

Application filed October 16, 1925. Serial No. 62,801.

This invention relates to forming bodies of plastic material of cementitious nature.

More particularly the invention relates to reenforcing for the walls of such bodies and to the proper positioning of the former within the molds before the article is cast.

The primary object of the present invention is to provide an improved method and apparatus for properly positioning the reenforcement within the mold, and for readily enabling determination of the position of such reenforcement, and at the same time to provide for the free, easy and quick removal of the product from the mold and without interference from the positioning means, or scarring or grooving of the molding surface of the mold by the positioning means of the reenforcement upon removal of the product containing the reenforcement.

A further object of the invention is to provide spacing means of a texture which will not scar the mold and more specifically to provide in one aspect of the invention spacing means composed of a soft and readily expansible material which latter may, after completion of the product, be expanded so as to caulk the openings in which the spacing means appear.

It is a standard requirement of accepted engineering practice that hollow bodies such as pipes, columns and the like, have, for certain purposes, definite amounts of reenforcing embedded in their wall bodies. It is also of prime importance that the reenforcement be uniformly placed in the wall of such bodies.

Heretofore, the proper placing of such reenforcement has been so impractical as to approach impossibility, and engineers have accordingly required a greater amount of steel to be used than would be necessary should uniform and certain placement be secured.

I am able, by my invention to place the reenforcing at any desired position within the walls of such bodies and secure the same in such position until the body is completed and has taken its set. Moreover, by my novel method, the exact position of the reenforcing within the wall of the body, may be readily determined after the body has set and has been removed from the form or mold. My invention may also be practiced at a great saving of time, labor and expense, over the unsatisfactory methods heretofore employed.

The greatest advantage of this invention may be realized by employing molds of one-piece construction, from which the set bodies may be removed by such simple methods and apparatus as disclosed in my prior Patent, Number 1,457,185, and in my co-pending application herewith, Serial Number 51,679, and the following description will be in connection with forms and processes therein described, although this invention may be practiced to great advantage in molds of any character.

The invention may be readily understood by those skilled in the art from the following description, together with the accompanying drawings, wherein:—

Figure 1 shows an end view of a one-piece mold with the reenforcing position therein, prior to application of the fusible lining.

Figure 2 is a side elevational view of one form of spacing lug for the reenforcing showing means for securing the lug thereto.

Figure 3 is a top plan view of Figure 2.

Figure 4 shows a side elevational view of a modified form of the spacing lug.

Figure 5 is a plan view of the lug 5, secured to the reenforcing 2 by flexible members 4 of the spacing lug.

In Figure 1, 1 is a one-piece cylindrical mold and 2 is a cylindrical shaped reenforcement composed of circumferential and longitudinal members secured together at their intersections. 3—3 are spacing lugs mounted upon and secured to the reenforcing at any desired point about its outer circumference, by tie wires 4, the apex of the lugs being in contact with mold 1.

The lugs as shown in Figures 2 and 3 are composed of a lead body 5 cast about crossed wires 4 for tying or securing the lugs to the reenforcing. The body of the lug may be made of any non-corroding material other than lead and should be soft and readily expandible under pressure or impact, that the same may be expanded by a punch or the like after the body is set, to secure the perfect exclusion of moisture from around its body.

In Figure 4 is shown a modified form of the lug body 5 in the top of which is formed a hole or depression into which is inserted a pin 7. This pin may be made of any readily frangible material such as a composition of plaster-of-Paris or wood, and should preferably be provided with an uneven surface such as shown at 8, so a suitable anchor will be provided in the set body thereabout for a plug of suitable material with which the hole is to be filled after the body is removed from the form. Lead or cement are suitable for filling this hole and rendering the same waterproof. To aid in the removal of the pin 7, it may be coated with a readily fusible material which will melt on the application thereto of a low degree of heat such as is ordinarily used for curing concrete bodies.

The operation is as follows:

As an illustration for making a reenforced body, an outer conforming member or mold 1 is selected, the inside diameter of which is of the desired outside diameter of the body to be made. The reenforcing 2 is formed into cylindrical contour and of such smaller circumference than the inside of the mold as will provide for the reenforcing of the body in the desired relation to its outer or inner surface. Spacing lugs 5 are then selected whose bodies are of the predetermined thickness at which the reenforcing is to be imbedded in the wall of the body formed. The lugs 5 are secured to and upon the outer circumference of reenforcing member 2, by flexible members 4—4, which may be wires, at as many points as necessary to evenly space the reenforcing from the inner wall of the mold. The reenforcing assembly is then introduced into the mold, the lug members only, being in contact therewith and securely positioning the circumferential and longitudinal relation of the reenforcing to the mold. Should it be desired to have the reenforcing nearer the surface of the completed body at any point than at others, correspondingly shorter and longer lug members are employed to effect this positioning as desired.

The mold is now lined with a readily fusible material to facilitate removal of the completed body from the mold as described in my prior Patent 1,457,185, or in my copending application herewith, Serial Number 51,679, although any style of mold construction may be used, as well as any method employed for removal of the completed set body from the mold.

After the plastic material has been introduced into the mold and about the reenforcing and allowed to set or harden, the fusible material is melted and the product then is removed therefrom as a completed body. The lugs 4 have held the reenforcing in the exact predetermined position in the body and they are visible on and project from the outer surface of the body, thus showing the position of the reenforcing to which they are secured. When the fusible material is melted away, the lugs will project beyond the periphery of the body or molded product and being of soft material, such as lead, will readily yield to the weight of the body and not cause pinching or binding of the body in the mold or scarring of the latter. The projecting ends of the lugs may be tamped or expanded into their seats by a punch or the like, to insure the complete exclusion of all water and moisture from the body.

As shown in Figure 4 the lug member may be provided with a readily frangible material such as a composition of plaster-of-Paris or of soft wood, to project through the outer surface of the body and contact with the inner wall of the form. These frangible extensions or wooden members 7 may be provided with uneven outer surfaces as indicated at 8 in Figure 4. This member is broken out of its seat after the body is completed. The position of the reenforcement can then be readily determined. The holes in the surface of the body created by the removal of member 7 may then be filled with a non-corroding calking element such as lead or neat cement. The uneven surfaces provided in the hole left in the body by the member 7 provide suitable anchors for the calking. Member 7 may itself be coated with a fusible material and the same softened or removed by heat, such as in curing a concrete body, to facilitate the removal of the member.

It will be readily noted that when the mold lining is fused and drawn away, the cast body is supported within the mold and away from all surfaces thereof thus permitting a free circulation of any curing agent, such as steam, about all the outer surface of the body. The spacing lugs are of such material as to collapse when the body is moved or to offer minimum resistance to its longitudinal removal from the mold.

What I claim is:

1. Means for spacing reenforcements in concrete bodies comprising a lead lug provided with flexible members for securing the lug to the reenforcing.

2. Means for spacing molds and reenforcing for concrete bodies in predetermined relation consisting of lugs of soft non-corrosive metal adapted to be mounted upon the reenforcing and project against the wall of the mold.

3. Means for spacing reenforcing for concrete bodies in cylindrical molds consisting of soft non-corroding metal lugs whose length is equal to the difference in the length of the radii of the outer periphery of the reenforcing and the inner periphery of the mold.

4. A method of reenforcing concrete bodies consisting of spacing the reenforcement away from the walls of the mold with soft metal lugs, introducing the concrete in plastic mass into the mold and about the reenforcement, allowing the concrete to set and expanding the lug body tightly against the concrete body so as to exclude water therefrom.

5. The method of manufacturing hollow reenforced bodies of plastic materials consisting of inserting a reenforcing in a mold, spacing the reenforcing therein with soft metal lugs lining the mold with a fusible material, rotating the mold, introducing plastic material therein and about the reenforcing and spacing lugs, densifying the concrete by centrifugal force, fusing the mold lining and removing the body therefrom by longitudinal movement of the body out of the mold.

6. The method of manufacturing reenforced articles of plastic materials consisting of spacing reenforcing in a mold with soft metal lugs, lining the mold with fusible material, introducing the plastic mass into the mold and about the reenforcing and lugs, fusing the mold lining and removing the body after it has set, and expanding the lugs against the confining space of the article.

7. The method of manufacturing reenforced articles of plastic material consisting of spacing reenforcing in a mold with a lug adapted to contact with the mold, lining the mold with fusible material, introducing the plastic about the reenforcing and the spacing lugs, then in fusing the mold lining and removing the completed body after it has set by longitudinal movement of the body out of the mold.

8. The method of spacing reenforcing for concrete bodies consisting of mounting upon the renforcing and against the mold soft metal lugs whose length is equal to the difference in the length of the radii of the outer periphery of the reenforcing and the inner periphery of the mold.

9. A device for spacing reenforcements for concrete bodies from the molding surface of the mold during molding of the body composed of lugs and means to secure same to the reenforcment, said lugs being formed of soft metal so as to yield when subjected to the weight of the molded body and to also permit of spreading thereof to caulk the openings occupied in the molded body by the lugs.

10. A device for spacing reenforcements for concrete bodies from the molding surface of the mold during molding of the body composed of lugs and means to secure same to the reenforcement, said lugs being formed of noncorrosive soft metal to cause same to yield when subjected to the weight of the mold body and to also permit of spreading thereof to caulk the openings occupied in the molded body by the lugs.

11. The herein described method of reenforcing concrete bodies consisting in applying yieldable spacing means to the reenforcement and positioning the same in a mold and with the spacing means engaged with the molding surface of the mold, then in applying the fusible lining to the molding surface of the mold, introducing plastic material into the mold to form the concrete body, fusing the lining after hardening of the concrete body, thereby causing the outer ends of the spacing means to project beyond the molded body and then in moving the body out of the mold.

12. The herein described method of reenforcing concrete bodies consisting in applying spacing means formed of material capable of being expanded to the reenforcement and positioning with the same within a conforming surface and with the spacing means engaged with such suface, then in applying a fusible lining to the surface, introducing plastic material to form the concrete body, fusing the lining after hardening of the concrete body, thereby causing the outer ends of the spacing means to project beyond the molded body and then in moving the body out of the surface and in upsetting the said projecting ends of the spacing means against the body.

13. A method of casting reenforced hollow ware of plastic material, which includes the steps of spacing the reenforcing for the body in a confining surface with lugs projecting against such surface, lining the surface with fusible material, casting the body about the reenforcing and spacing lugs, fusing the mold lining thereby supporting the cast body away from the surface by the reenforcing spacing lugs, curing the body by circulation of the curing media through the space between the body and the surface and removing the body longitudinally from the surface after curing.

14. The method of casting hollow ware which resides in placing supporting media against a confining surface, coating such surface with fusible material, rotating a plastic mass against such surface and about the supporting media to form the ware, then in fusing the coating to cause the ware to be held spaced from the surface by said media, and then in curing the ware by flowing a curing agent through said space.

15. The method of casting hollow ware which resides in placing supporting media against a confining surface, coating such surface with fusible material, rotating a plastic mass against such surface and about the supporting media to form the ware, then in fusing the coating to cause the ware to be held spaced from the surface by said media.

In testimony whereof I affix my signature.

CLIFFORD R. NICHOLS.